United States Patent [19]
Mikulin

[11] Patent Number: 4,984,688
[45] Date of Patent: Jan. 15, 1991

[54] FILM BOX

[75] Inventor: Joseph F. Mikulin, North Brunswick, N.J.

[73] Assignee: E. I. Du Pont De Nemours & Co., Wilmington, Del.

[21] Appl. No.: 379,645

[22] Filed: Jul. 14, 1989

[51] Int. Cl.$^5$ .............................................. B65D 85/48
[52] U.S. Cl. .................................. 206/455; 206/815; 220/354; 220/355; 220/410
[58] Field of Search ............... 206/215, 454, 455, 456, 206/815; 220/352, 354, 355, 410; 354/275

[56] References Cited

U.S. PATENT DOCUMENTS

| 877,078 | 1/1908 | Havenhill et al. | 206/455 |
|---|---|---|---|
| 2,354,706 | 8/1944 | Rulon | 206/455 |
| 3,185,298 | 5/1965 | Verspecht | 206/455 |
| 3,458,033 | 7/1969 | Ariyasu et al. | 206/455 |
| 3,511,990 | 5/1970 | Hauss | 206/455 X |
| 3,645,388 | 2/1972 | Fessenden | 206/455 |
| 3,695,424 | 10/1972 | Cristy et al. | 206/455 |
| 3,710,977 | 1/1973 | Van den Enden et al. | 221/102 |
| 4,055,270 | 10/1977 | Underwood | 220/354 X |
| 4,467,919 | 8/1984 | Bengtsson et al. | 206/455 |
| 4,784,906 | 11/1988 | Akao | 206/455 X |
| 4,828,106 | 5/1989 | Akao et al. | 206/455 X |
| 4,869,368 | 9/1989 | Hara | 206/455 |

Primary Examiner—Paul T. Sewell
Assistant Examiner—Jacob K. Ackun, Jr.
Attorney, Agent, or Firm—Thomas H. Magee

[57] ABSTRACT

A packaging system for the protection and shipment of photographic film sheets comprises a box including a container and a cover adapted to close over an opening in the container. The container has a flexible tray element inserted within a rigid outer section of the container. The tray element and the cover have cooperative mating members disposed adjacent to the perimeter of the cover for tightly joining together respective surface portions thereof when the cover closes over the opening. The tray element also has an integral retaining lip for exerting pressure on film inserted within the tray element.

17 Claims, 3 Drawing Sheets

FILM BOX

BACKGROUND OF THE INVENTION

1. Field of the Invention

This invention pertains to a box adapted to hold sheets of actinic-sensitive material and, in particular, to a packaging system useful for safe containment of photographic films and the like. More particularly, this invention relates to a photographic film package comprising a box which does not require the use of an internal bag or pouch to protect the film during handling and to prevent accidental exposure thereof.

2. Description of Related Art

Light-sensitive photographic film sheets are generally manufactured in quantity, packaged in the desired way, and then shipped to customers for use. It is necessary to protect these film sheets from any damage that may occur during shipment and to prevent accidental exposure. Conventionally, producers of these film sheets place a particular number of these sheets in an opaque, laminated container, e.g. a foil bag or pouch, and then tape that container closed to prevent light, moisture or dirt from penetrating therein. The bag is then placed in a cardboard box for shipment. During shipment, the film sheets tend to shift within the package wherein abrasion can occur causing defects on the surfaces of the sheets. Additionally, it is not particularly convenient for the manufacturer of these film sheets to insert the sheets into such a bag during the packing and finishing operation. Also, it is inconvenient for the user to open and reclose this plastic bag, since both of these steps must be accomplished in reduced light. Moreover, since film sheets are finished in a plurality of different sizes, the manufacturer must stock a wide variety of boxes and bags to match the sizes produced. This stocking of a variety of bag and box sizes is inconvenient and costly. Also, insertion of film sheets in a bag is awkward. Finally, dirt, dust and paper fibers can be produced when the prior art packaging systems are used. This dirt can settle on the film surface and interfere with the use thereof.

Prior art references describe a plurality of packaging systems which can be used to contain photographic film elements and the like. These include packages made from paper and plastic materials among others. Most of these references describe boxes which have novel features to assist in the handling steps upon arrival at a customer location. These features include snap tops or devices which eject film sheets from the box. Some of the prior art references describe methods for protecting these photosensitive film sheets from accidental exposure during handling. None of the prior art references describes a packaging concept which permits the manufacturer to easily place the film sheets in the box, and the user to easily remove the film sheets therefrom. None of the references describes a packaging concept which eliminates the use of a black bag and yet can still protect the film sheets during shipment thereof. None of these references describe a packaging system that will reduce the number of box sizes which must be maintained. Thus, there is a pressing need within the film manufacturing field to produce a strong, sturdy box with these features.

It is an object of this invention to provide a unique packaging system for the shipment and protection of light-sensitive photographic films and the like. It is another object of this invention to provide a photographic film packaging system that is easy to use for both the manufacturer of the film and the user thereof, one which will eliminate the use of a bag system and will reduce artifacts produced during the shipment of the film. Yet another object is to produce a packaging system which can be used to accommodate a plurality of film sizes.

SUMMARY OF THE INVENTION

The present invention comprises a box adapted to hold actinic-sensitive film including a container and a cover adapted to close over an opening in the container. The container has a flexible tray element adjoining a rigid outer section of the container. The tray element and the cover have cooperative mating members disposed adjacent to the perimeter of the cover for tightly joining together respective surface portions thereof when the cover closes over the opening. The tray element also has an integral retaining lip for exerting pressure on film inserted within the tray element.

DETAILED DESCRIPTION OF THE PREFERRED EMBODIMENTS

Figure 1:
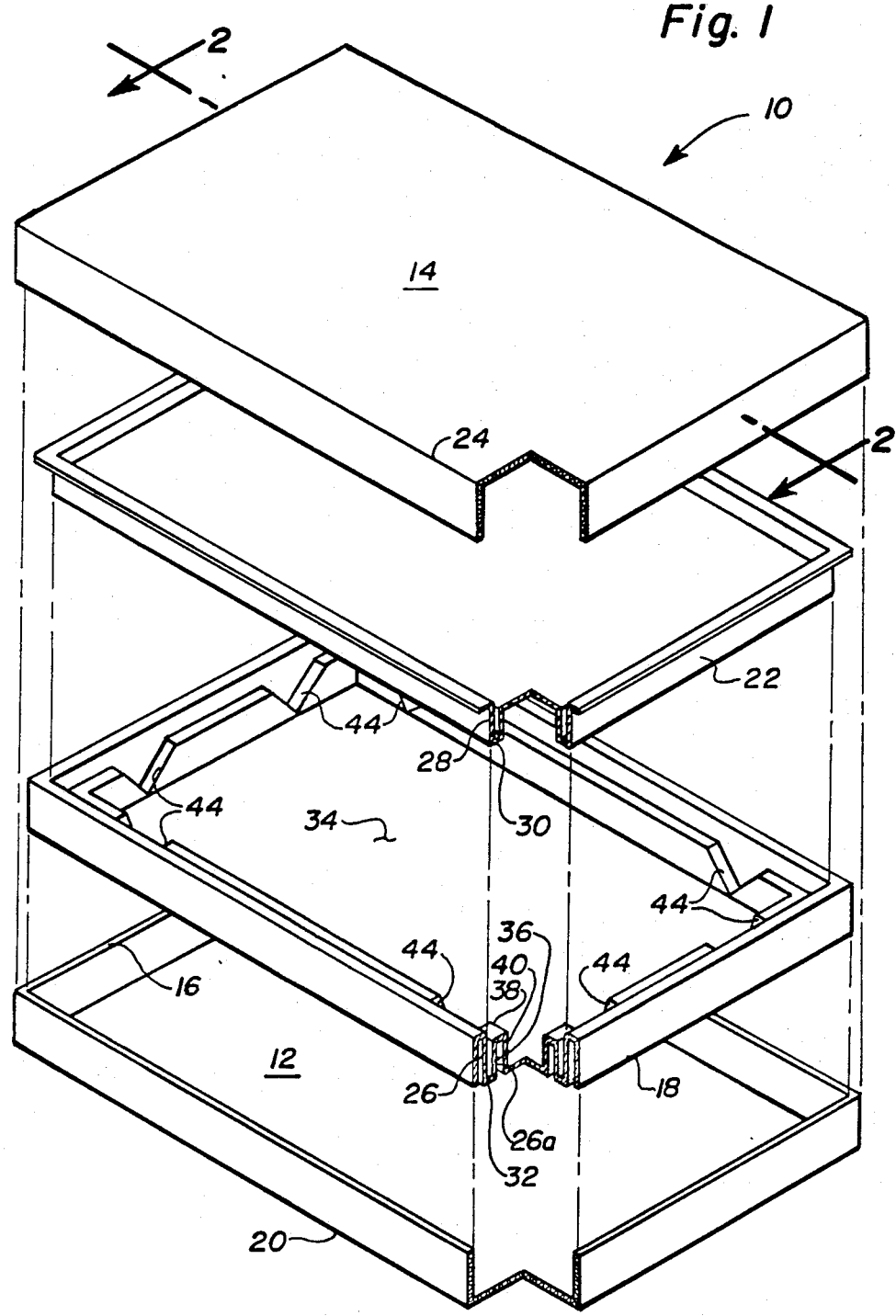
FIG. 1 is an exploded perspective view, partially cut away, of a preferred embodiment of the film box.
Figure 2:
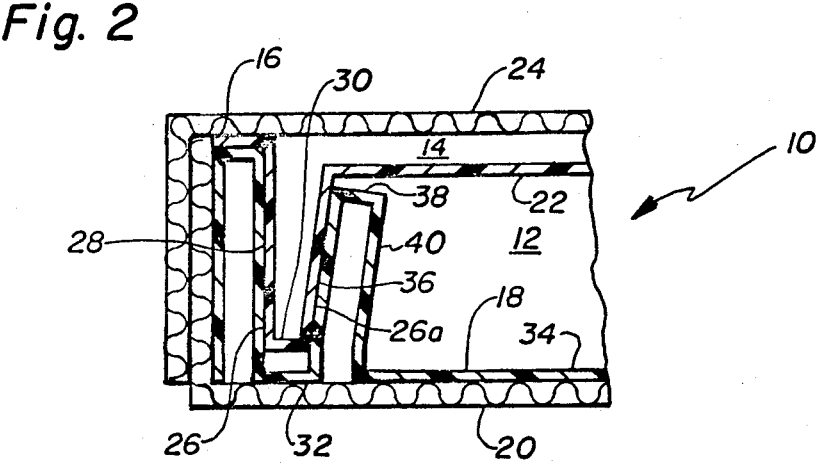
FIG. 2 is a partial cross-sectional view taken along line 2—2 of FIG. 1 when the box is in a closed position.
Figure 3:
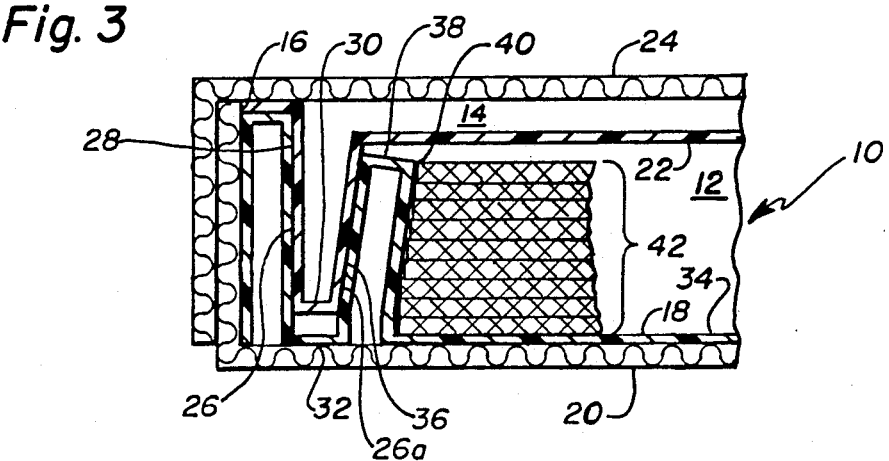
FIG. 3 is a partial cross-sectional view taken along line 2—2 of FIG. 1 when the box is in a closed position and has sheets of film inserted therein.

FIGS. 1 through 3 show a film box 10 adapted to hold actinic-sensitive film including a container 12 and a cover 14 adapted to close over an opening 16 in the container 12. The container 12 has a flexible inner tray element 18 inserted within an outer section 20 of the container 12. In the embodiment shown in FIG. 1, the cover 14 has a flexible inner element 22 inserted within an outer section 24 of the cover 14. The outer sections 20 and 24 of both the container 12 and the cover 14 are more rigid than the inner elements 18 and 22. The outer section 24 of the cover 14 is slightly larger than the outer section 20 of the container 12 so that the cover 14 can close over the opening 16 in the container 12.

The tray element 18 and the cover 14 have cooperative mating means disposed adjacent to the perimeter of the cover 14 for tightly joining together respective surface portions 26 and 28 thereof when the cover 14 closes over the opening 16. In the embodiment of FIG. 1, the mating means comprises a male member 30 disposed in the inner element 22 of the cover 14, and a female member 32 disposed in the tray element 18. In the present invention, it is important that the flexible surface portions 26 and 28 mate tightly together along the perimeter of the cover 14 in order to prevent light and dust particles from entering the closed box 10.

The mating means of the film box 10 further comprises means for exerting pressure on film inserted within a central portion 34 of the tray element 18. As shown in FIGS. 2 and 3, the joined surface portion 26a of the female member 32 nearest the central portion 34 of the tray element also forms an outside portion 36 of an integral retaining lip 38. The means for exerting pressure comprises the male member 30 being shaped, e.g. wedgelike, so as to cause a cam-like bending of the lip 38 toward the central portion 34 of the tray element 18 when the male member 30 is mated with the female member 32. The lip 38 is relatively thin so as to be sufficiently flexible to allow the inside portion 40 thereof to contact and exert pressure on photographic film sheets 42 inserted within the tray element 18, as shown in FIG. 3. Consequently, when the cover 14 closes over the opening 16 and causes the male member 30 to mate with the female member 32, a pushing action occurs along the retaining lip 38 which results in a firm joining of the two inner elements 18 and 22 combined with an exerting of pressure by the lip 38 on the film sheets 42 contained within the tray element 18. In this manner, the film sheets 42 are tightly gripped by the retaining lip 38. This then prevents slippage of the film sheets 42 during shipment and reduces handling artifacts which might be caused during shipment. Additionally, a variety of film sheet sizes can be incorporated within the box 10 since the means for exerting pressure has a certain radius of flexibility to accommodate different film sheet sizes.

The retaining lip 38 should be disposed adjacent substantially the entire perimeter of the film box 10 in order to achieve the aforementioned benefits. In vacuum forming the sides of the retaining lip 38 to match the film sheet size, the corner areas of the lip 38 may be removed, as shown by one of the corner areas in FIG. 1. Also, as shown in FIG. 1, the retaining lip 38 may have a plurality of V-shaped notches 44 therein spaced along the lip 38 to facilitate removal of the film sheets 42 from the tray element 18 by a user.

Figure 4:
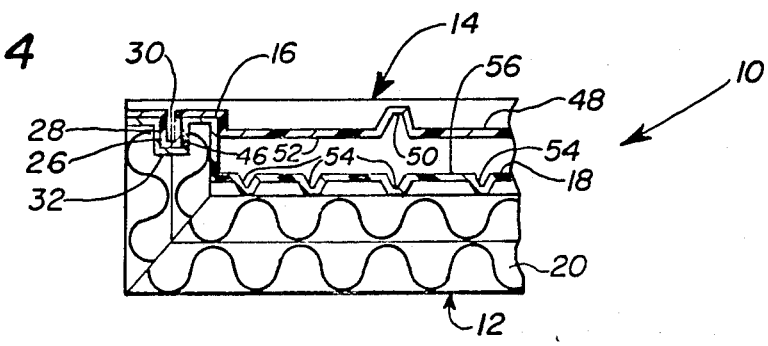
FIGS. 4 through 6 are partial cross-sectional views of other preferred embodiments of the film box.
Figure 5:
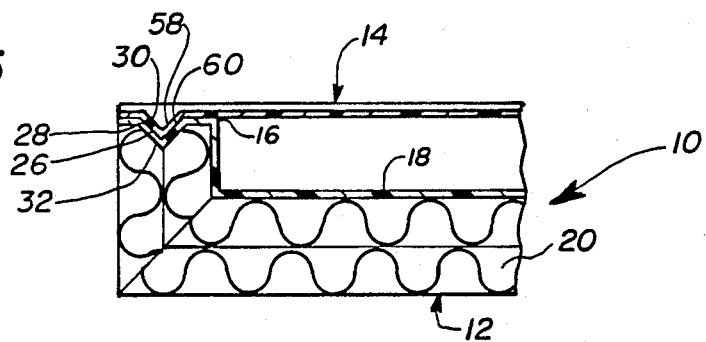
Figure 6:
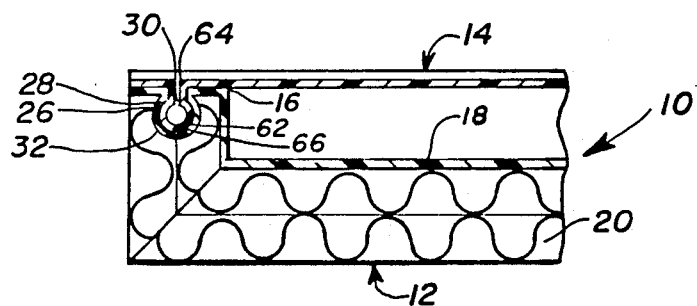

FIGS. 4 through 6 show alternative mating means having corresponding members thereof numbered the same as similar members shown in FIGS. 2 and 3. In the present film box 10, the mating means may take a variety of shapes, as illustrated, providing the male and female surface portions 28 and 26 fit tightly together along the perimeter of the cover 14 so as to prevent light and dust particles from entering the closed box 10. The format of the mating means may take an oblong, square, rectangular, oval or round surface shape, for example, as long as the respective surface portions 26 and 28 may be press fitted together in a tight and closed position. Since the inner elements 18 and 22 are flexible, the joining of the respective surface portions 28 and 26 is facilitated, allowing the surface portions 28 and 26 of the respective male and female members 30 and 32 to be gripped together during the mating to provide a close, light-tight fit.

In FIG. 4, the joined surface portion 26 of the female member 32 comprises the sides of a rectangular groove 46. The joined surface portion 28 of the male member 30 comprises the sides of a rectangular shaped surface complementary to the surface of the rectangular groove 46. Also, in this embodiment, the inner element 22 of the cover 14 has a compression member 48 shaped so as to project through the opening 16 into the container 12 and exert pressure on film inserted within the tray element 18. The compression member 48 may have an integral rib-like recess 50 disposed along a surface 52 thereof for structural support. Additionally, the tray element 18 may have at least one integral rib-like recess 54 disposed along a surface 56 thereof for structural support.

FIG. 5 shows a film box 10 wherein the joined surface portions 28 and 26 of the respective male and female members 30 and 32 comprise V-shaped surfaces 58 and 60 disposed adjacent the entire perimeter of the cover 14. The V-shaped surfaces 58 and 60 may be tightly gripped together by peelable adhesive closure means.

In FIG. 6, the film box 10 further comprises means for latching the cover 14 to the container 12 so as to hold together the tightly joined surface portions 28 and 26 of the respective male and female members 30 and 32. In this embodiment, the latching means comprises the female member 32 having a cylindrical groove 62 with an expandable slit-shaped opening 64 that snaps shut after insertion of a male member 30 having a cylindrically shaped surface portion 66 complementary to the cylindrical groove 62.

The outer sections of the film box 10 may be fabricated out of conventionally known materials for the manufacture of boxes. These include cardboard and other paper products, for example. Corrugated cardboard is a particularly preferred material for the outer sections of this box 10. As mentioned previously, the outer section 24 of the cover 14 is normally made somewhat larger than the outer section 20 of the container 12 so as to cover the container 12 when the two sections 20 and 24 are joined in a closed position. In this configuration, it is preferred that this covering action be snug so as to prevent accidental opening of the box 10 at an inopportune time. The overall size of the box 10 is immaterial since photographic film sheets 42 come in all sizes, and it is thus necessary to produce boxes of many different sizes. However, because of the means for exerting pressure generated by the mating means of the inner elements 18 and 22 of the film box 10, it is not necessary to have a different size of box for every size of film sheet. The inner elements 18 and 22 of the film box 10 will adjust over a range of film sheet sizes, thus presenting a clear advantage in the requisite number of boxes in addition to the enhanced protection that this box 10 provides for the film sheets 42 contained therein.

The inner elements 18 and 22 are preferably manufactured from flexible plastics. These can be easily press molded, vacuum molded, or injection molded, for example, in the various configurations shown. There are many flexible plastics that can be utilized for the inner elements 18 and 22. These include vinyls, polyethylenes, low density commingling polyesters, and mixtures thereof among many others. Vacuum molded black plastic is preferred for the inner elements 18 and 22. Other flexible materials may be used as long as the mating means can be formed in the inner elements 18 and 22. The materials of construction are relatively inexpensive, thereby minimizing cost of manufacture.

The inner element 22 of the cover 14 fits snugly in the outer section 24 of the cover 14, and the tray element 18 fits snugly within the outer section 20 of the container 12. The inner elements 18 and 22 may be permanently mounted in the outer sections 20 and 24, respectively, such as by gluing. Alternatively, the inner elements 18 and 22 may be press fitted in the outer sections 20 and 24, so as to allow the inner elements 18 and 22 to be removable therefrom.

Since the inner elements 18 and 22 are part of the entire package, the overall strength of the film box 10 is enhanced. The resulting reinforcement of the outer sections 20 and 24 of the box 10 by the inner elements 18 and 22 is particularly noted in the corners thereof. During shipment or handling, damage is most likely to occur in the corner areas. The inner elements 18 and 22 of the present invention add further utility to the film box 10 by putting additional strength at the corner areas. Thus, the box 10 can be reused by the customer, for example, since its structural integrity is maintained well beyond the normal life of a prior art box.

When utilizing the film box 10, the cover 14 is placed over the container 12 and pressure is applied to allow the cooperative mating means to join together tightly. This mating action serves a dual purpose. First, the joining into place of the mating means connects the inner elements 18 and 22 firmly and prevents light leakage which might expose the photographic film sheets contained therein. Since the inner elements 18 and 22 are flexible, the necessary joining of the surface portions 26 and 28 is facilitated, thereby allowing the surface portions 26 and 28 to come together snugly during the mating to provide a close, light-tight fit. Secondly, a pressing action occurs on the sheets of film. The cam-like action of the means for exerting pressure holds the film sheets tightly in place, and the entire package thus becomes a unitized element. This pressing action prevents slippage of the film sheets during shipment or handling, thereby preventing abrasion marks from forming. This action also allows one box to serve a wide range of film sizes since the flexibility of the retaining lip 38 in the tray element 18 combined with the pressing action will accommodate a variety of sheet sizes. The present mating means can also be interlocking so as to snap together or latch during the mating. Such a latching action would prevent accidental opening of the box 10, thereby precluding an unintentional exposing of its film contents.

The present film box 10 provides a packaging system that represents a clear advantage over the prior art in cleanliness. Prior art systems utilize a variety of paper products such as interleave sheets, stuffers, etc., which can cause dust, dirt and paper fibers to contaminate the system. The present system requires no contact with these other paper products, thus providing for an extremely clean packaging system. The film sheets can be easily accessed by the user since there is no cumbersome bag to open under reduced light. The film sheets are thus protected from light exposure and from damage in this unique packaging concept.

What is claimed is:

1. In a box adapted to hold actinic-sensitive film, said box including a container and a cover adapted to close over an opening in said container, the improvement comprising said container having a flexible tray element inserted within and adjoining an outer section of said container and said cover having a flexible cover element inserted within and adjoining an outer section of said cover, said tray element and said cover element having cooperative mating means disposed adjacent to the perimeter of said cover for tightly joining together respective flexible surface portions thereof when said cover closes over said opening, said mating means comprising a male member disposed in one of the tray or cover elements and a female member disposed in the other element, said outer sections of both said container and said cover being more rigid than said flexible elements.

2. A box as defined in claim 1 wherein the joined surface portions of said male and said female members comprise V-shaped surfaces disposed adjacent the entire perimeter of said cover.

3. A box as defined in claim 1 further comprising means for latching said cover to said container so as to hold together the tightly joined surface portions of said male and said female members.

4. A box as defined in claim 3 wherein said latching means comprises said female member having a cylindrical groove with an expandable slit-shaped opening that snaps shut after insertion of a male member having a cylindrically shaped surface portion complementary to said cylindrical groove.

5. A box as defined in claim 1 wherein the joined surface portion of said female member comprises the sides of a rectangular groove, and said joined surface portion of said male member comprises the sides of a rectangular shaped surface complementary to the surface of said rectangular groove.

6. A box as defined in claim 5 wherein said inner element of said cover has a compression member shaped so as to project through said opening into said container and exert pressure on film inserted within said tray element.

7. A box as defined in claim 6 wherein said compression member has an integral rib-like recess disposed along a surface thereof for structural support.

8. A box as defined in claim 5 wherein said tray element has at least one integral rib-like recess disposed along a surface thereof for structural support.

9. A box as defined in claim 1 wherein said mating means further comprises means for exerting pressure on film inserted within a central portion of said tray element.

10. A box as defined in claim 9 wherein the joined surface portion of said female member nearest the central portion of said tray element also forms an outside portion of an integral retaining lip, and wherein said means for exerting pressure comprises said male member being shaped so as to cause a cam-like bending of said lip toward the central portion of said tray element when said male member is mated with said female member, said lip being sufficiently flexible to allow the inside portion thereof to contact and exert pressure on film inserted within said tray element.

11. A box as defined in claim 10 wherein said retaining lip is disposed adjacent the entire perimeter of said box except for corner areas thereof.

12. A box as defined in claim 10 wherein said retaining lip has one or more notches therein to facilitate access to film inserted within said tray element.

13. A box as defined in claim 12 wherein said retaining lip has a plurality of V-shaped notches spaced along said lip.

14. A box as defined in claim 10 in combination with photographic film sheets tightly gripped therein by said means for exerting pressure.

15. A box as defined in claim 1 wherein said flexible elements comprise flexible plastic formed by a process selected from the group consisting of vacuum molded, press molded, and injection molded.

16. A box as defined in claim 15 wherein said flexible elements comprise vacuum molded black plastic glued, respectively, to said outer sections.

17. A box as defined in claim 1 wherein said outer sections comprise corrugated cardboard.

* * * * *